US008888589B2

(12) United States Patent
Brunet de Courssou et al.

(10) Patent No.: US 8,888,589 B2
(45) Date of Patent: Nov. 18, 2014

(54) 3D WAGERING FOR 3D VIDEO REEL SLOT MACHINES

(75) Inventors: Thierry Brunet de Courssou, Henderson, NV (US); Cameron Anthony Filipour, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1893 days.

(21) Appl. No.: 12/052,694

(22) Filed: Mar. 20, 2008

(65) Prior Publication Data

US 2008/0234032 A1 Sep. 25, 2008

Related U.S. Application Data

(60) Provisional application No. 60/895,881, filed on Mar. 20, 2007.

(51) Int. Cl.
*A63F 13/00* (2014.01)
*G07F 17/32* (2006.01)
*G07F 17/34* (2006.01)

(52) U.S. Cl.
CPC ........ *G07F 17/3209* (2013.01); *G07F 17/3211* (2013.01); *G07F 17/34* (2013.01)
USPC ................................. 463/31; 463/16; 463/20

(58) Field of Classification Search
USPC ..................................................... 436/16-20
See application file for complete search history.

(56) References Cited

U.S. PATENT DOCUMENTS

| | | | |
|---|---|---|---|
| 4,593,904 | A | 6/1986 | Graves |
| 4,695,053 | A | 9/1987 | Vazquez, Jr. et al. |
| 5,342,049 | A | 8/1994 | Wichinsky et al. |
| 5,823,873 | A | 10/1998 | Moody |
| 6,012,983 | A | 1/2000 | Walker et al. |
| 6,019,374 | A | 2/2000 | Breeding |
| 6,050,895 | A | 4/2000 | Luciano, Jr. et al. |
| 6,077,163 | A | 6/2000 | Walker et al. |
| 6,244,957 | B1 | 6/2001 | Walker et al. |
| 6,267,669 | B1 | 7/2001 | Luciano, Jr. et al. |
| 6,283,474 | B1 | 9/2001 | de Keller |
| 6,409,597 | B1 | 6/2002 | Mizumoto |
| 6,517,433 | B2 | 2/2003 | Loose et al. |
| 6,522,312 | B2 | 2/2003 | Ohshima et al. |
| 6,746,329 | B1 * | 6/2004 | Duhamel ........................ 463/20 |

(Continued)

FOREIGN PATENT DOCUMENTS

GB 170937 A 8/1986

OTHER PUBLICATIONS

International Preliminary Report on Patentability of Oct. 1, 2009 in corresponding PCT Appln. PCT/US2008/057766.

(Continued)

*Primary Examiner* — David L Lewis
*Assistant Examiner* — Eric M Thomas
(74) *Attorney, Agent, or Firm* — Foley & Lardner LLP

(57) ABSTRACT

Methods and systems allowing video slot machine players to wager on symbols occurring on all sides of a reel, including the reel's front, back, top, bottom, and inside portions. Players may move reels in space to seek out winning paylines or win mystery bonuses on symbols combinations that occur on portions of the reel that may be initially hidden from their view. Features of embodiments of the present invention allow players to increase the number of paylines on which they can bet by a factor of four or more.

39 Claims, 6 Drawing Sheets

(56) References Cited

U.S. PATENT DOCUMENTS

| | | | | |
|---|---|---|---|---|
| 6,761,632 | B2 | 7/2004 | Bansemer et al. | |
| 6,811,482 | B2 | 11/2004 | Letovsky | |
| 6,887,157 | B2 | 5/2005 | LeMay et al. | |
| 7,004,834 | B2 * | 2/2006 | Walker et al. | 463/16 |
| 2002/0147040 | A1 | 10/2002 | Walker et al. | |
| 2003/0064781 | A1 | 4/2003 | Muir | |
| 2003/0211881 | A1 | 11/2003 | Walker et al. | |
| 2003/0220134 | A1 * | 11/2003 | Walker et al. | 463/20 |
| 2004/0009803 | A1 | 1/2004 | Bennett et al. | |
| 2004/0102238 | A1 | 5/2004 | Taylor | |
| 2005/0130737 | A1 * | 6/2005 | Englman et al. | 463/25 |
| 2005/0208994 | A1 | 9/2005 | Berman | |
| 2005/0255908 | A1 * | 11/2005 | Wells | 463/20 |
| 2006/0148554 | A1 | 7/2006 | Hornik et al. | |
| 2008/0045322 | A1 * | 2/2008 | Berman | 463/20 |

OTHER PUBLICATIONS

International Search Report and Written Opinion of ISR mailed on Aug. 7, 2008 in corresponding PCT application PCT/US2008/057766.

* cited by examiner

3D WAGERING FOR 3D VIDEO REEL SLOT MACHINES

CROSS-REFERENCE TO RELATED APPLICATIONS

This application claims the benefit under 35 U.S.C. §119 (e) of Provisional Patent Application No. 60/895,881, filed Mar. 20, 2007, which application is hereby incorporated herein by reference in its entirety.

BACKGROUND OF THE INVENTION

1. Field of the Invention

The present inventions relate generally to the field of regulated pay computer-controlled games, either pay-for-play (e.g. entertainment arcades, amusement arcades) or pay-for-wager (e.g. casino, video lottery, Fixed Odds Betting terminals or FOBT).

2. Description of the Prior Art and Related Information

The onscreen graphics and effects used within video reel slot machines have typically been presented in two-dimensions. The symbols on these machines are rendered in two-dimensions (hereafter, 2D) and the animation of such symbols is also confined to two dimensions, with rows of symbols typically rotating downward over a flat plane. In an attempt to make these 2D games more visually appealing, artists have conventionally used a number of techniques and creative animations such as shading and extrusion to enhance their appeal. While such effects may be impressive when viewed from a single angle, they do not feature any real sense of depth or texture.

As computing and slot machine technologies evolve, players will come to demand increasingly complex video renderings and enhanced functionality, even on venerable reel-based slot machines. Just as the advent of video slot machines allowed creative game designers to invent features that were not available under the mechanical reel model (such as symbol to symbol interaction, multi-line play, and secondary bonus games, for example), it is believed that the introduction of advanced graphics and enhanced functionalities will stimulate innovation and allow operators to offer players a whole new class of game.

SUMMARY OF THE INVENTION

Presented herein are video slot machine innovations that leverage three-dimensional rendering technology (hereafter, 3D) to deliver an enhanced gaming experience to players. Such innovations make use of 3D slot reels that may be moved in space and time and that may be viewed from a number of different perspective angles concurrently.

As a result of this enhanced reel flexibility, players may wager on 3D paylines, which allow them to form winning symbol combinations on any side of a reel, including its front, back, top, bottom and inside. Players may be given the right (either through purchase or random award) to rotate reels in search of winning symbol combinations on sides of the reel that are not immediately visible to them. Players may also wager on reels that are shown concurrently from a number of different angles such that the number of possible bets they can place may rise by fourfold or more.

Accordingly, an embodiment of the present invention is a regulated video slot gaming machine. The regulated gaming machine may include a display; a game controller configured to control the display, interact with a player and allow the player to place a wager on selected paylines in accordance with a predetermined paytable; a plurality of three-dimensionally represented reels displayed on the display, each of plurality of reels including a plurality of graphics thereon, the graphics being static, animated or video rendered, and each of the plurality of reels being configured to spin such that a portion of each of the reels, from a given perspective angle, is out of view as the reels spin and such that respective ones of the graphics of each reel come into and out of view as the reels spin, and one or more three-dimensionally represented paylines displayed on the display, the payline(s) being configured to wrap around the plurality of three-dimensionally represented reels such that a portion of each of the payline(s) faces the respective out of view portions of the plurality of reels.

According to further embodiments, each of the three-dimensionally represented payline(s) may wrap around the plurality of three-dimensionally represented reels horizontally, vertically, diagonally and/or in a zigzag pattern, for example. The plurality of three-dimensionally represented reels may be configured to be rotatable from the given perspective angle to a player-selected perspective angle to reveal the out of view portions of the reels. The player selected perspective angle may be controlled using a multi-touch display, for example.

According to another embodiment thereof, the present invention is a method that may include steps of providing a regulated video slot gaming machine having a display and a game controller configured to control the display, interact with a player and allow the player to place a wager on selected paylines in accordance with a predetermined paytable; configuring the gaming machine to display a plurality of three-dimensional reels on the display, each of the plurality of reels including a plurality of graphics, the graphics being static, animated or video rendered; configuring the gaming machine to spin the displayed reels such that a portion of each of the reels, from a given perspective angle, is out of view as the reels spin and such that respective ones of the plurality of graphics of each of the reels come into and out of view as the reels spin, and configuring the gaming machine to display one or more three-dimensional paylines on the display and configuring the payline(s) to wrap around the plurality of three-dimensionally represented reels such that a portion of each of the three-dimensional payline(s) faces the respective out of view portions of the plurality of reels.

The last configuring step may include configuring the gaming machine to wrap the three-dimensionally represented payline(s) around the plurality of three-dimensionally represented reels horizontally, vertically, diagonally and/or in a zigzag pattern, for example. The method may also include a step of enabling wagering on the portion of the three-dimensional payline(s) that faces the respective out of view portions of the plurality of reels in accordance with the predetermined paytable. The method may also include a step of configuring the gaming machine to enable the player to change the given perspective angle using a pointing device, a predetermined button and/or a multi-touch display, for example. A step of configuring the gaming machine may be carried out to enable the player to rotate the plurality of displayed three-dimensional reels using a pointing device, a predetermined button and/or a multi-touch display, for example.

According to still another embodiment thereof, the present invention is a regulated video slot gaming machine. The gaming machine may include a display; a game controller configured to control the display, interact with a player and allow a player to place a wager on selected paylines in accordance with a predetermined paytable; a plurality of three-dimensionally represented reels displayed on the display, each of plurality of reels including a plurality of three-dimensional symbol holders, each face of each symbol holder being configured to display a symbol thereon and each of the plurality of three-dimensional symbol holders being configured to spin such that one or more of the faces of each symbol holder is out of view as the reels spin; one or more three-dimensional paylines displayed on the display, the payline(s) being configured to wrap around the plurality of three-dimensionally represented reels such that a portion of the payline is out of view, each of the payline(s) being represented horizontally, vertically, diagonally and/or in a zigzag pattern, for example.

Each of the plurality of reels may be configured to spin. Two or more faces of each symbol holder have a same symbol thereon. Each face of each symbol holder may have a different symbol thereon. At least one of the plurality of symbol holders may be a cube. One or more of the plurality of symbol holders may be a hemisphere, a cuboid, a tetrahedron, a cylinder, a cone, an octahedron, a prism, a pyramid or a dodecahedron, for example. One or more of the plurality of symbol holders may be configured to change shapes at least once before, during and/or after a spinning of the plurality of reels. Shapes of the symbol holders appearing under the payline may constitute a combination on which a wager may be placed. Symbols appearing under the payline and shapes of the symbol holders appearing under the payline, in combination, may constitute a combination on which a wager may be placed. One or more face of each symbol holder may show a video rendering of the symbol animation or a 3D animation of the symbol. The video rendering or the 3D animation of each symbol holder appearing under the payline may constitute a combination on which a wager may be placed. Each face of each symbol holder may be configured to display a symbol thereon and at least one attribute selected from a group including color, texture and movement and a combination of one or more symbols, colors, textures and movements may constitute a combination on which a wager may be placed.

The plurality of three-dimensional reels and the three-dimensional payline may be displayed from a perspective point of view and the perspective point of view may be configured to be changeable by a player of the gaming machine using a pointing device, a predetermined button and/or a multi-touch display (for example) or by a software executing in the game controller. The plurality of three-dimensional reels and the three-dimensional payline may be displayed from a plurality of perspective points of view simultaneously on the display.

According to another embodiment, the present invention is a method, comprising providing a regulated video slot gaming machine having a display and a game controller configured to control the display, interact with a player and allow the player to place a wager on selected paylines in accordance with a predetermined paytable; configuring the gaming machine to display a plurality of three-dimensional reels, each of the plurality of reels including a plurality of three-dimensional symbol holders, each face of each symbol holder being configured to display a symbol thereon and each of the plurality of three-dimensional symbol holders being configured to spin such that at least one face of each symbol holder is out of view as the reels spin; configuring the gaming machine to display one or more three-dimensional paylines, the payline(s) being configured to wrap around the plurality of three-dimensionally represented reels such that a portion of the payline(s) is/are out of view; spinning one or more of the plurality of three-dimensional symbol holders, and giving a reward when a winning combination appears under the payline after the spinning step.

The spinning step may also spin one or more of the plurality of reels. The first configuring step may be carried out such that two or more faces of each symbol holder have a same symbol thereon. The first configuring step may be carried out such that each face of each symbol holder has a different symbol thereon. The first configuring step may be carried out such that one or more of the plurality of symbol holders is a cube. The first configuring step may be carried out such that one or more of the plurality of symbol holders is a hemisphere, a cuboid, a tetrahedron, a cylinder, a cone, an octahedron, a prism, a pyramid or a dodecahedron, for example. The method may further include a step of changing the shape of one or more of the plurality of symbol holders at least once before, during and/or after the spinning step. The reward giving step may be carried out with the shapes of the symbol holders appearing under the payline constituting a combination on which a wager may be placed. The reward giving step may be carried out with the symbols appearing under the payline and the shapes of the symbol holders appearing under the payline, in combination, constituting a combination on which a wager may be placed. The method may further include a step of showing a video rendering of the symbol animation or a 3D animation of the symbol on one or more faces of each symbol holder. The reward giving step may be carried out with the video rendering or the 3D animation of each symbol holder appearing under the payline constituting a combination on which a wager may be placed. The first configuring step may be carried out with each face of each symbol holder displaying thereon a symbol and one or more attributes selected from a group including color, texture and movement, and the winning combination may include a predetermined combination of one or more symbols, colors, textures and/or movements. The configuring steps may be carried out such that the plurality of three-dimensional reels and the three-dimensional payline are displayed from a perspective point of view and the method further may include a step of enabling the perspective point of view to be changeable by a player of the gaming machine or by a software executing in the game controller. The method may further include a step of displaying the plurality of three-dimensional reels and the three-dimensional payline from a plurality of perspective points of view simultaneously.

The present invention, according to yet another embodiment thereof, is a regulated gaming machine. The regulated gaming machine may include a display; a game controller configured to control the display, interact with a player and allow the player to place a wager on selected paylines in accordance with a predetermined paytable; a plurality of three-dimensionally represented reels displayed on the display, each of plurality of reels including a plurality of three-dimensional symbol holders, each face of each symbol holder being configured to display a symbol thereon and each of the plurality of three-dimensional symbol holders being configured to spin such that one or more faces of each symbol holder are out of view as the reels spin, the plurality of reels collectively defining a plurality of rows of three-dimensional symbol holders and a plurality of columns of three-dimensional symbol holders; one or more three-dimensional paylines displayed on the display, the payline(s) being configured to wrap around the plurality of three-dimensionally represented reels such that a portion of each of the payline(s) is out of view, each symbol holder, each of the plurality of rows of three-dimensional symbol holders and each of the plurality of columns of three-dimensional symbol holders being configured to be independently spun.

The present invention, according to still another embodiment of the present invention, is a method, comprising steps of providing a regulated gaming machine having a display and a game controller configured to control the display, interact with a player and allow the player to place a wager on selected paylines in accordance with a predetermined paytable; configuring the gaming machine to display a plurality of three-dimensional reels, each of plurality of reels including a plurality of three-dimensional symbol holders, each face of each symbol holder being configured to display a symbol thereon and each of the plurality of three-dimensional symbol holders being configured to spin such that one or more faces of each symbol holder is out of view as the reels spin, the plurality of reels collectively defining a plurality of rows of three-dimensional symbol holders and a plurality of columns of three-dimensional symbol holders, each of the symbol holders, each of the plurality of rows of three-dimensional symbol holders and each of the plurality of columns of three-dimensional symbol holders being configured to be independently spun; configuring the gaming machine to display one or more three-dimensional paylines, the payline(s) being configured to wrap around the plurality of three-dimensionally represented reels such that a portion of each of the payline(s) is out of view, and carrying out at least one of spinning the plurality of reels; spinning a selected one of the plurality of rows of three-dimensional symbol holders; spinning a selected one of the plurality of columns of three-dimensional symbol holders, and spinning a selected individual one of the plurality of three-dimensional symbol holders, and giving a reward when a winning combination appears under the payline after the spinning step.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Embodiments of the present invention may be implemented alone or in combination with the subject matter of commonly assigned and co-pending U.S. Provisional Patent Application No. 60/886,895, filed Jan. 26, 2007.

Figure 1A:
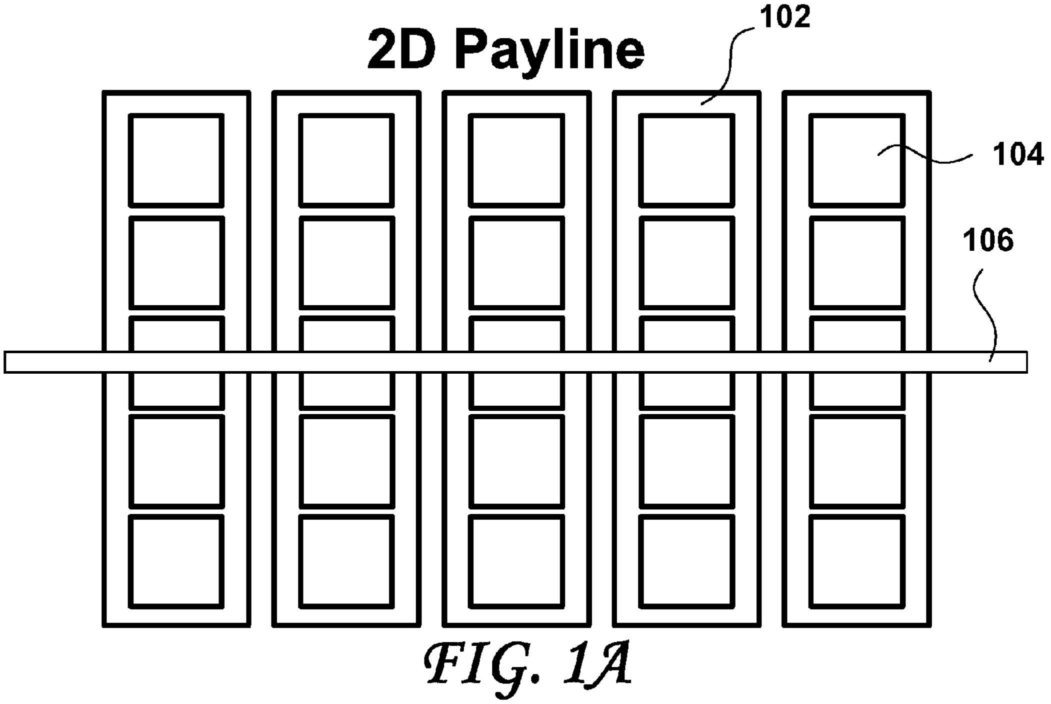
FIG. 1A (Prior Art)
FIG. 1A shows conventional video slot machine reels.

FIG. 1A depicts conventional video slot machine reels. The displays 102 on such machines are presented in two dimensions. The spaces allocated to contain symbols, also known as "symbol compartments" 104 are presented in two dimensions and the symbols contained within symbol compartments are presented in two dimensions as well. The paylines 106 on such machines appear flat, as they are also presented in 2D. For clarity, only a single, straight payline is shown in this diagram (and other diagrams). Video reel slot machines featuring a plurality of paylines may be represented similarly.

Figure 1B:
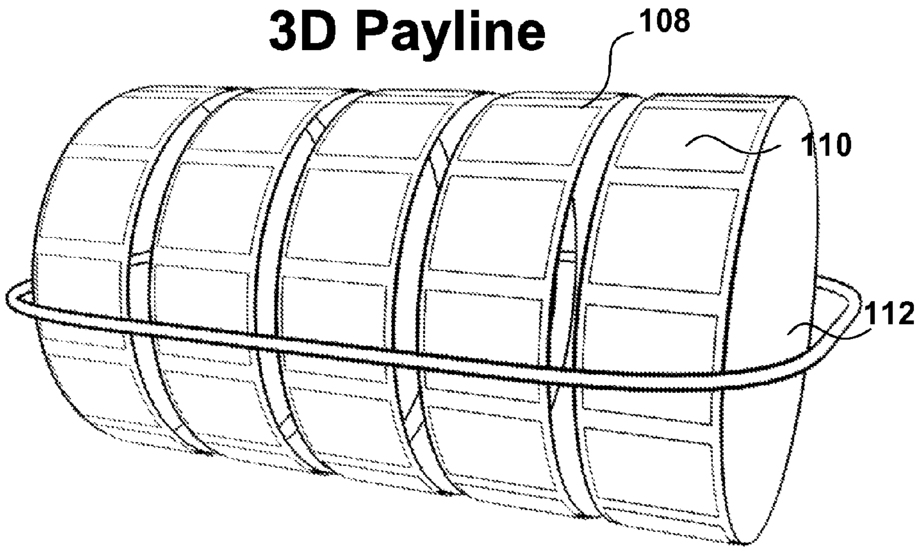
FIG. 1B depicts 3D video slot machine reels with a 3D payline, according to an embodiment of the present invention.

FIG. 1B shows exemplary 3D video slot machine reels with a 3D payline, according to an embodiment of the present invention. As reels 108 are presented to players in true 3D, their symbol compartments 110 contain depth, perspective and dynamic lighting and appear differently at different reel positions. The symbols contained within symbol compartments 110 may also (but need not) feature depth, perspective, animation, and/or dynamic lighting to further reinforce the player's three dimensional perception of the reels. Dynamic lighting may include illumination and reflection from multiple light sources; the light source may have different preset colors, vary in color, vary in intensity and/or be animated (a group of flying fireflies, for example). The 3D assembly including reels 108, symbols 110 and payline 112, for example, may be animated with a slight swinging motion to accentuate a feeling of floating in 3D space.

In addition, 3D reels according to embodiments of the present inventions afford game designers the ability to offer players a number of new features. One such feature is the 3D payline 112, which may wrap around reels either horizontally (as is shown in FIG. 1B), vertically, diagonally or in a zigzag pattern. 3D paylines allow the player to wager on a greater number of possible symbol combinations and to achieve wins using parts of the reel that had not been previously available for wagering using conventional methods and 2D reels. Indeed, 3D paylines may allow the player to place wagers and achieve a win on a part of the reel that is not even visible to them. For clarity, only a single, straight payline is shown in this diagram (and other diagrams). Video reel slot machines featuring a plurality of 3D paylines may be represented similarly.

Figure 2:
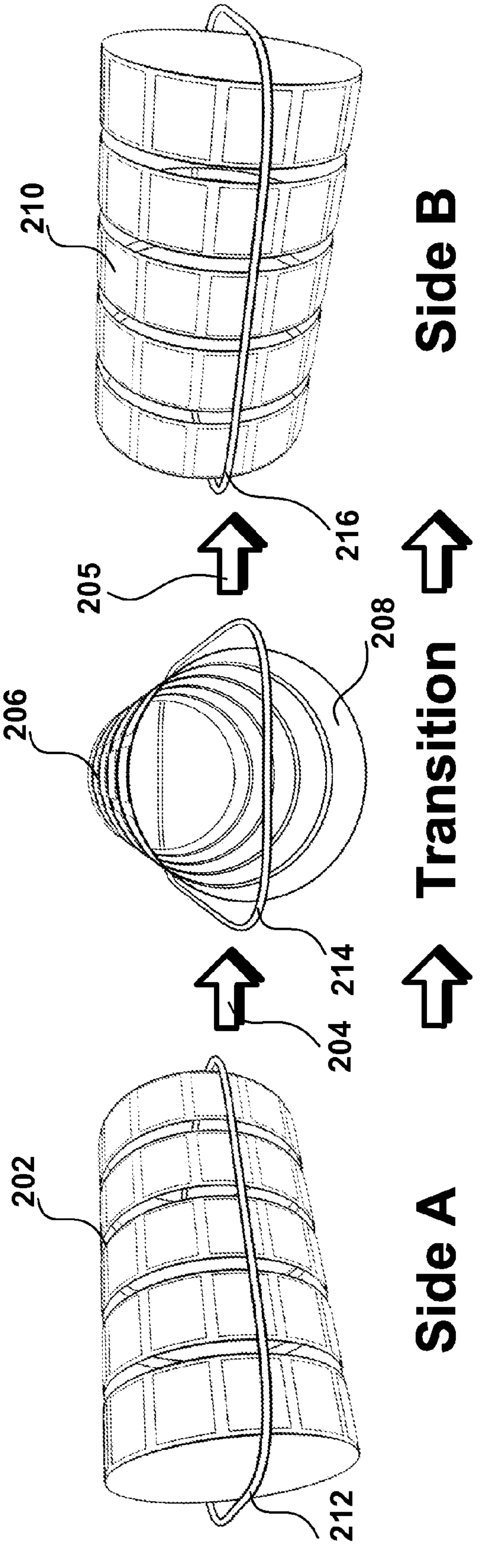
FIG. 2 illustrates how 3D video slot reels may rotate to reveal winning or non-winning symbol combinations from multiple perspective angles, according to further embodiments of the present invention.

FIG. 2 illustrates how 3D video slot reels may rotate to reveal winning or non-winning symbol combinations from multiple perspective angles. Because reels 202 created in true 3D have depth and perspective, they may move dynamically in space and time, as suggested by reference numerals 204 and 205. Multi-touch video displays such as, for example, the Microsoft Surface and Apple iPhone user interface technology may advantageously be used to manipulate the reel in the 3D space (to perform rotations, scaling, etc). Joysticks, pointing devices or other similar control devices may also be used. Using such 3D reels whose view is easily controlled by the player, operators may offer players a whole new class of game that allows them to wager on sides of the reel that may not be immediately visible to them, such as the top 206 or the bottom 208 or the back 210.

Two significant new features that may be offered on 3D reels according to embodiments of the present invention include the 3D reel movement nudge and the mystery hidden symbol award. The 3D reel movement nudge allows players to buy the right to rotate a reel in search of winning symbol combinations on portions of the reel that are not immediately visible. After a player has finished spinning the reels, the machine may offer the player an opportunity to purchase this feature. If the player-chosen rotation reveals a winning symbol combination (based on the paylines the player has previously selected), the player is rewarded. Automatic orientation and zooming animation of the 3D reel to expose the hidden symbol award may be implemented by software control as an alternative to the player interacting to control the viewing.

The mystery hidden symbol award allows players to achieve "free" wins based on symbols combinations on hidden portions of the reel, even though the player did not wager on such paylines or symbols. This award may be triggered via the game's random number generator. Other features may be offered, taking full advantage of the true three-dimensional structure of the present slot machine reels, and all such features are deemed to fall within the scope of the present inventions.

Figure 3A:
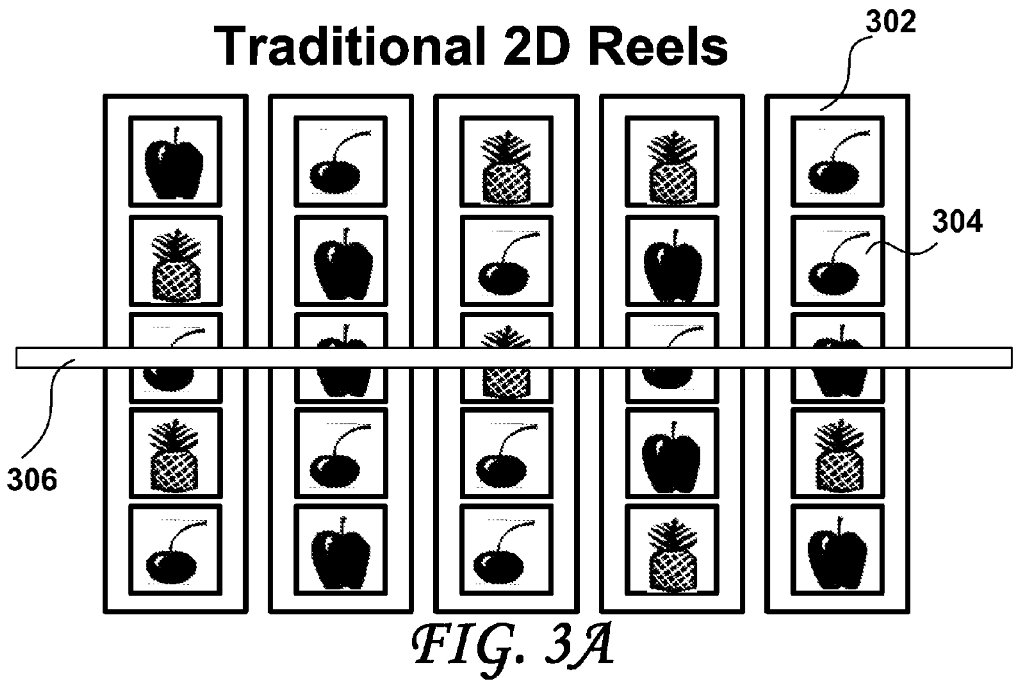
FIG. 3A (Prior Art)
FIG. 3*a* depicts conventional video slot machine reels.

FIG. 3A depicts conventional 2D video slot machine reels. The displays 302 on such machines and all game symbols 304 are represented in two dimensions. The paylines 306 on such machines appear flat, as they are also presented in 2D.

Figure 3B:
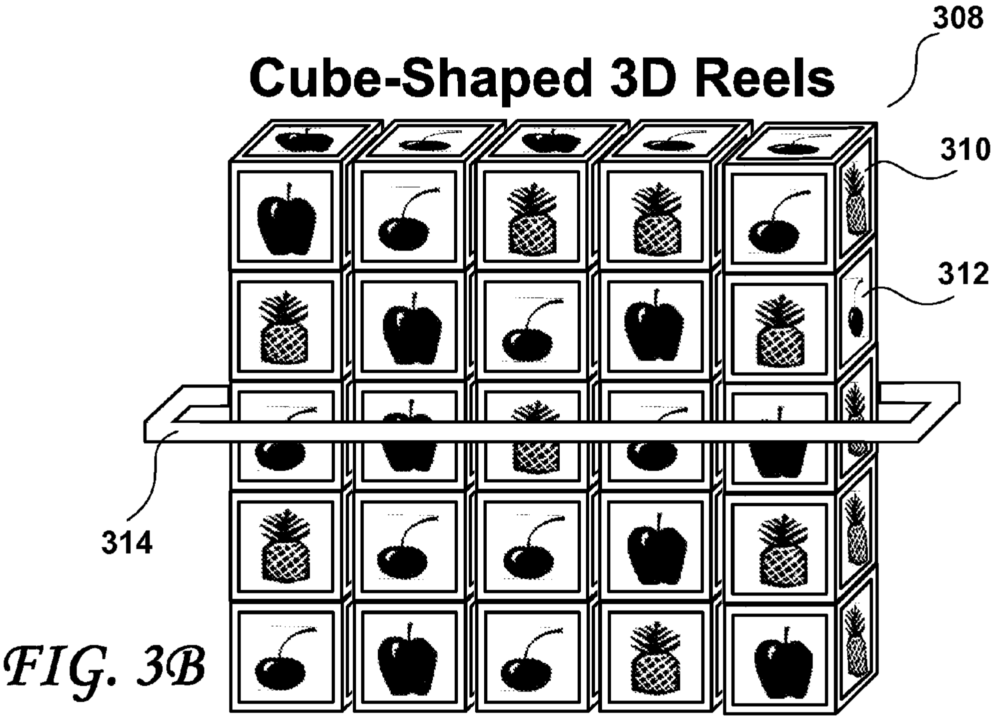
FIG. 3B depicts slot reels with a 3D reel payline, according an embodiment of the present invention.

FIG. 3B shows 3D cube-shaped slot reels with a 3D rectangular reel payline that fully encircles the cube-shaped slot reels. 3D cube-shaped reels 308 feature 3D cube symbol holders 310, which may feature a symbol 312 on each of their six sides. All six symbols on a cube symbol holder may be unique or one or more symbol may appear on multiple sides of the cube. The featured cube symbol holder 310 shows a pineapple symbol on its front side and a cherry symbol on its rightmost side.

Cube-shaped slot reels may be provided with a depth of one symbol, as is depicted in FIG. 3B, or they may be provided with a depth of multiple symbols. Cube-shaped reels with a height, width, and depth of five symbols (5-symbol depth is not shown on FIG. 3*b*) may make it possible for players to achieve winning paylines on any of the cube-shaped reel's six sides.

The paylines on 3D cube-shaped slots reels may also be three dimensional. As also shown in FIG. 3B, the payline 314 wraps around the cube-shaped reels such that it may encompass symbols on all sides of the cube-shaped reel. While a single payline has been depicted in FIG. 3B for the purpose of clarity, it is to be understood that cube-shaped reel machines featuring a plurality of paylines are also possible. It is also to be understood that while the constituent elements of the reels shown in the figures are cube-shaped, embodiments of the present inventions are not restricted to such a cube shape. Indeed, each or some of constituent elements of the 3D reels according to embodiments of the present invention may have or assume a shape that is other than cubic. For example, one or more of the constituent elements of the present 3D reels may be or include a hemisphere, a cuboid, a tetrahedron, a cylinder, a cone, an octahedron, a prism, a pyramid, or even a dodecahedron. Other shapes may also be used to great advantage, as may other compound or irregular shapes. According to further embodiments, reels may feature constituent elements of more than one shape. According to further embodiments, one or more of the constituent elements of the present 3D reels may serially assume or morph into a plurality of shapes (which may be well defined or amorphous and diffuse) as the reels spin. In turn, changing shapes may provide yet another dimension for placing wagers. Indeed, even though the symbols on a predetermined payline may not constitute a winning combination, matching shapes across a payline (or a predetermined combination of shapes across a payline) may constitute a winning combination. Combinations of the shapes of constituent elements of a reel and the symbols respectively appearing thereon may provide still further opportunities for wagers and for rewarding players. 3D reels and 3D symbols according to embodiments of the present invention allow for many more dimensions of game play than was previously possible. Indeed, the symbols may themselves be animated, to appear to slither from one face of a constituent element of a 3D reel to another face thereof or from one constituent 3D element to another adjacent 3D element within a reel or across reels. Each face of each of the constituent elements of the present 3D reels may include full motion video, with each face or selected faces showing a different video. A winning combination may occur when the same video (or, to use a television analogy, the same channel) is shown on each of the constituent elements across a given payline. As the images would then be synchronized, winning combinations will be immediately apparent to the player. Graphic artists and persons of skill in this and related arts may devise other ways to exploit the three dimensional nature of the slot machine reels presented herein, and all such variations are deemed to fall within the scope of the embodiments shown and described herein.

Figure 4A:
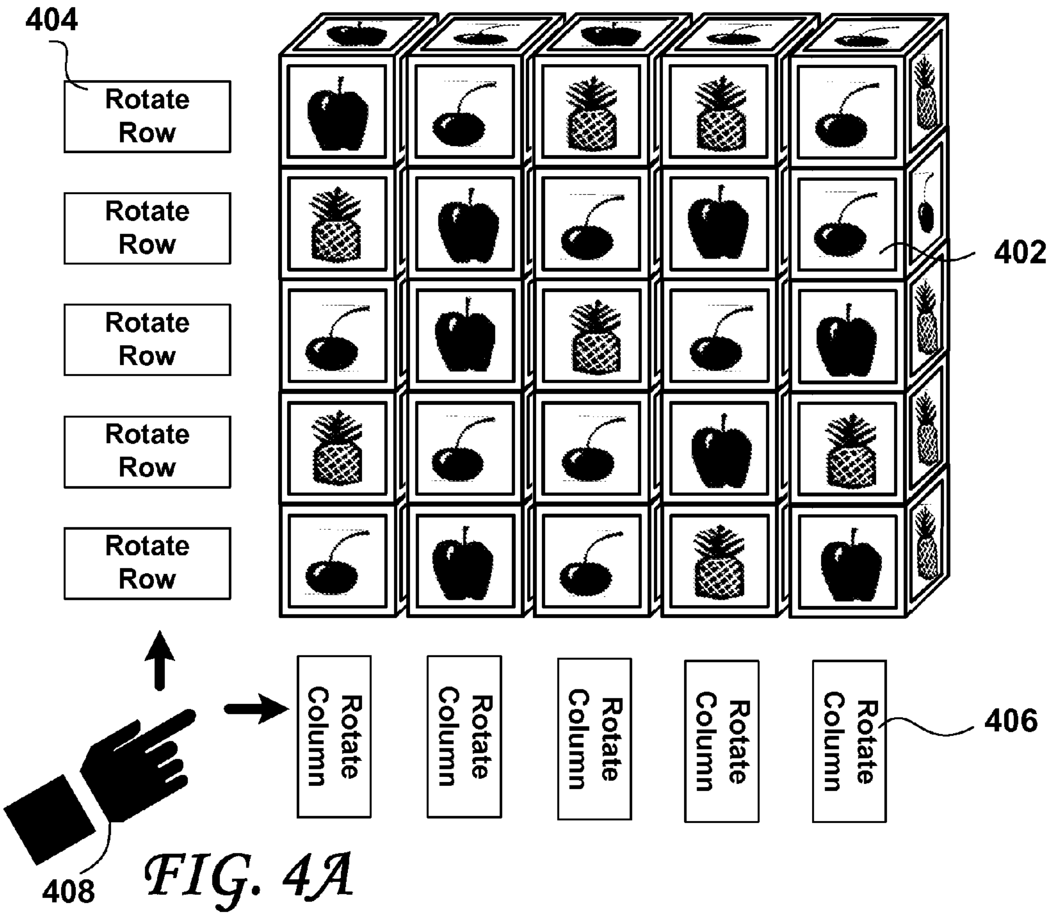
FIG. 4A illustrates how players may elect to rotate 3D slot reels either vertically or horizontally, according to further embodiments of the present invention.

FIG. 4A illustrates how players may elect to rotate 3D (cube-shaped, in this example) slot reels either vertically or horizontally. Players wagering on such reels 402 may have the opportunity to spin a grouping of symbols in either a horizontal or vertical manner. When a player touches using the hand device 408 (for example), the "Rotate Row" button 404 on such a game, only the symbols in that horizontal row will spin randomly. When a player touches the "Rotate Column" button 406 on such a game, only the symbols in that vertical column will spin randomly. This option gives the player more flexibility in determining the final symbol placement on a game's reels than conventional methods had previously afforded. Players may purchase the right to rotate a grouping of symbols or they may win the right to do so via a random award.

Figure 4B:
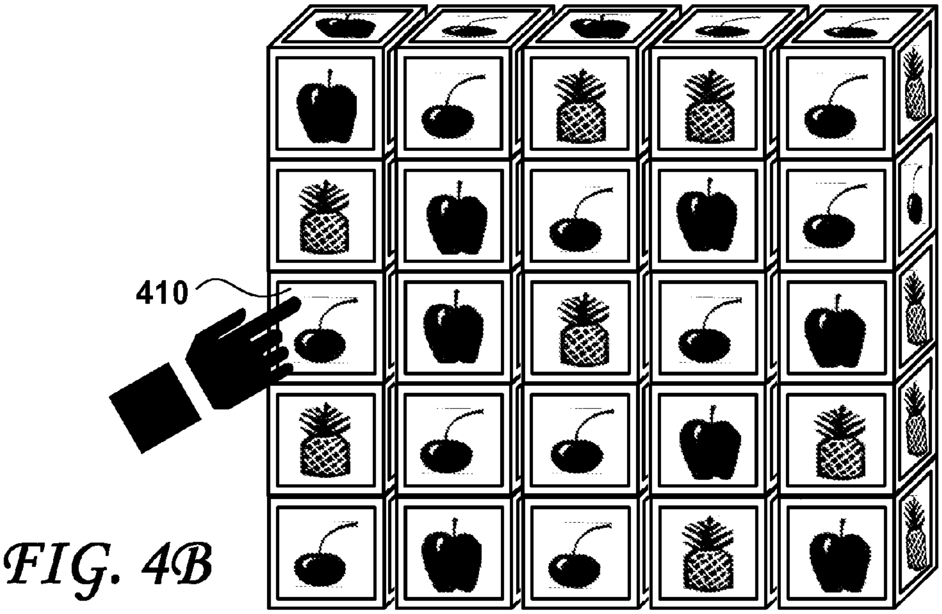
FIG. 4B illustrates how players may elect to spin a single symbol on a set of 3D slot reels, according to a further embodiment of the present invention.

FIG. 4B illustrates how players may elect to spin a single symbol on a set of 3D cube-shaped slot reels, according to another embodiment of the present invention. This feature allows players to spin a single symbol randomly simply by touching it, as suggested at reference numeral 412. Players may purchase the right to spin a single symbol or they may win the right to do so via the outcome of a random draw.

Figure 5:
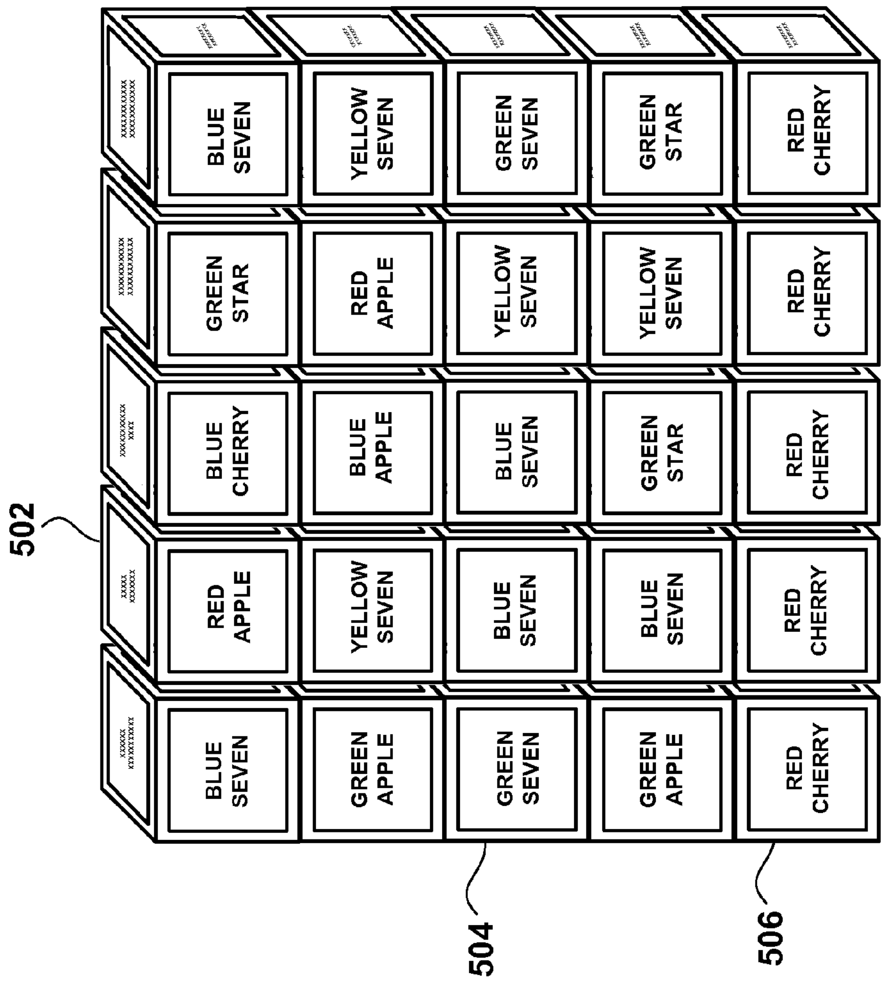
FIG. 5 depicts 3D slot reels employing symbol art and symbol color as exemplary symbol match criteria, according to a further embodiment of the present invention.

FIG. 5 depicts 3D cube-shaped slot reels employing two symbol match criteria: symbol art and symbol color, according to further embodiments of the present invention. 3D cube-shaped slot reels 502 may make use of multiple symbol matching criteria to further enhance game play. In the example depicted, players may achieve awards by matching cubes of the same color or by matching cubes featuring the same symbol. When players match cubes having the same color and the same symbol, their awards may be higher. For example, the player matching five sevens on row 504 would receive an award for matching five of the same symbols. The player matching five red cherries on row 506 would receive a larger award for matching five cubes of both the same symbol and color. Games may be devised to allow for most any other search criteria, such as texture, matching movement, sound or any manifestations that may be perceptible to the player.

Figure 6:
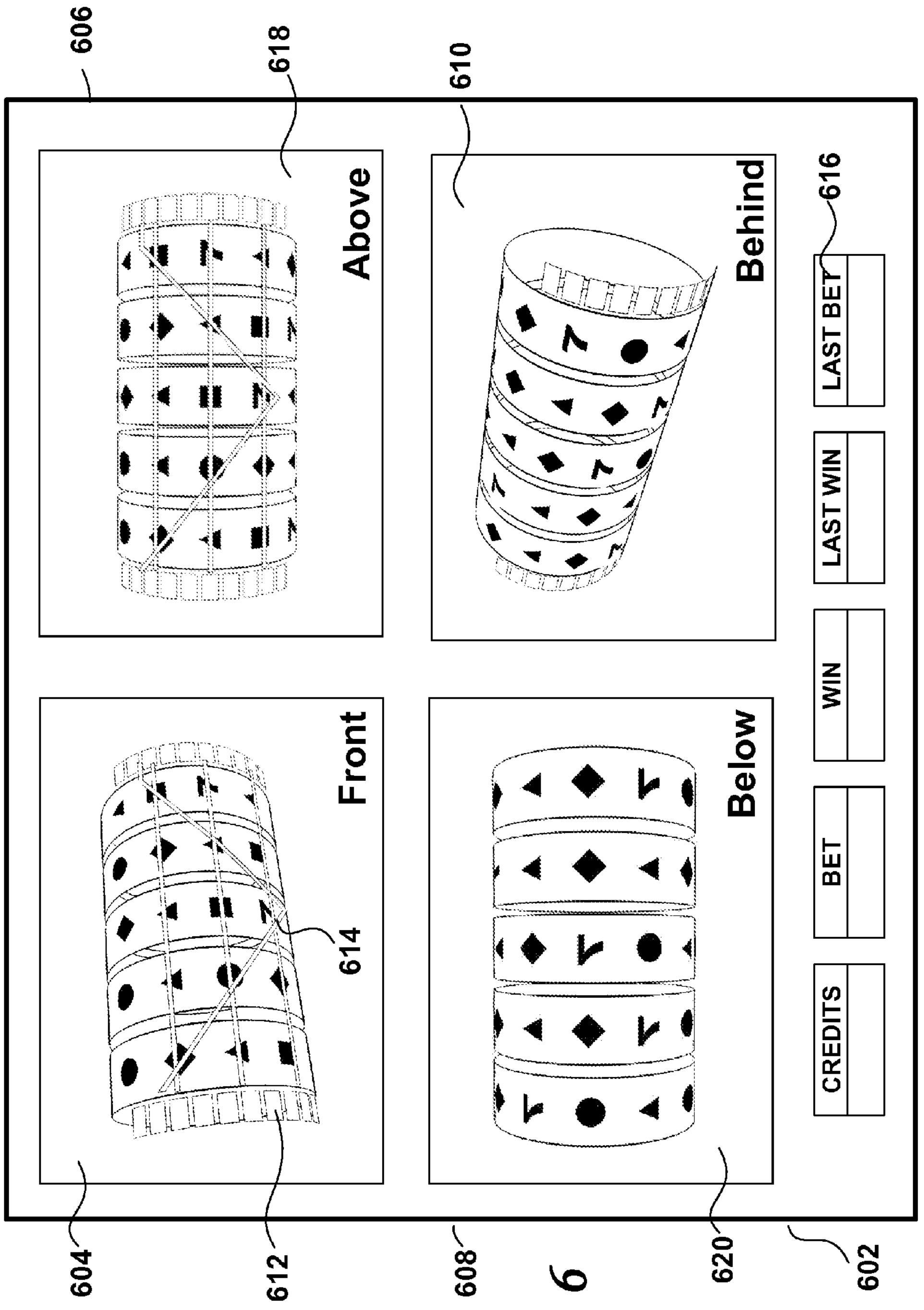
FIG. 6 shows a 3D video slot reels presented to players using a multi-camera approach, according to further embodiments of the present invention.

FIG. 6 depicts 3D video slot reels presented to players using a multi-camera approach, according to further embodiments of the present invention. Games featuring multiple camera angles 602 may display multiple views of a single reel, each view presented in a separate window. For example, FIG. 6 depicts the front side of a reel (marked as "Front") in one window 604, the top of the reel 606 in a second window, the bottom of the reel 608 in a third window, and the back of a reel (marked as "Behind") in yet a forth window 610. When depicting the back of a reel, the game may automatically adopt a camera angle that allows players to view symbols in a “right side up” configuration.

Paylines 612 on a multi-camera angle machine may appear only on a single side as is depicted in the “Front” and “Above” windows of FIG. 6 or they may not appear at all (if the player wishes not to wager on a particular camera angle) as is depicted in the “Back” and “Below” windows, or they may appear in the 3D style depicted in FIGS. 1B and 2. Alternatively, the player may be provided with suitable controls to provide them with the ability to control the camera angle themselves. That is, the user may be given the ability to fluidly swing the camera from one side of the spinning reels to another, to view the top, bottom, front and rear of the reels by manipulating a virtual movable camera. Alternatively still, the same effect may be had by allowing the user to freely rotate the spinning reels at will over the x, y and z axes to visually inspect all sides thereof. Multi-touch video displays such as, for example, Microsoft Surface and Apple iPhone user interface technology may advantageously be used to manipulate the reel in the 3D space (to perform rotations, scaling, etc). Joysticks, pointing devices or other similar control devices may also be used.

Three dimensional Payline indicators 614 may also appear in one or more windows to assist players in selecting which paylines to play. The gaming meters on games using the multi-camera approach may be presented cumulatively 616, as is depicted in FIG. 6. In alternate embodiments of the invention, each camera angle may feature its own meters. There may also be a configuration in which the game associates a set of meters with each camera angle and maintains a cumulative set of meters as well.

Multi-camera angle configurations feature more possible symbol combinations on which to wager and thus increase the player’s excitement and the operator’s profitability. For example, a five row, five column reel of the prior art would typically not allow the player to wager on more than 45 paylines on a single spin. A five row, five column 3D reel using multiple camera angles according to embodiments of the present invention, however, could easily quadruple the number of paylines offered to the player by simply depicting a reel from four angles concurrently and giving the player 180 possible paylines on which to wager.

A multi-camera game using very simple symbols like triangles, circles, diamonds, and sevens is depicted in FIG. 6 for purposes of illustration. In preferred embodiments, multi-camera games may make use of creative, colorful 2D or 3D symbols, animation or even full motion video.

Advantageously, the 3D reels may be rendered hollow 208 such that symbols and paylines may be displayed on the inside of the reels, these symbols being identical or independent from the symbols displayed on the outside of the reels. The symbols on the outside and the symbols on the inside may appear bound or, alternatively, may appear like two concentric wheels spinning independently. The outside reels and the inside reels may be spun at the same time or independently, as a wager or as a bonus round.

While the foregoing detailed description has described several embodiments of this invention, it is to be understood that the above description is illustrative only and not limiting of the disclosed invention. For example, while a multi-camera angle game with four camera angles was described, a game with 5, 10, or 100 camera angles may also be used. Also, return to player and price matrix are not discussed but may be derived by persons of skill in this art. Indeed, a number of modifications will no doubt occur to persons of skill in this art. All such modifications, however, should be deemed to fall within the scope of the present inventions.

What is claimed is:

1. A method, comprising:

providing a regulated gaming machine having a display and a game controller configured to control the display, interact with a player and allow the player to place a wager on selected paylines in accordance with a predetermined paytable;

configuring the gaming machine to display a plurality of three-dimensional reels, each of plurality of reels including a plurality of three-dimensional symbol holders, each face of each symbol holder being configured to display a symbol thereon and each of the plurality of three-dimensional symbol holders being configured to spin such that at least one face of each symbol holder is out of view as the reels spin, the plurality of reels collectively defining a plurality of rows of three-dimensional symbol holders and a plurality of columns of three-dimensional symbol holders, each of the symbol holders, each of the plurality of rows of three-dimensional symbol holders and each of the plurality of columns of three-dimensional symbol holders being configured to be independently spun;

configuring the gaming machine to display at least one three-dimensional payline, the at least one payline being configured to wrap around the plurality of three-dimensionally represented reels such that a portion of each of the at least one payline is out of view;

carrying out at least one of:

spinning the plurality of reels; spinning a selected one of the plurality of rows of three-dimensional symbol holders;

spinning a selected one of the plurality of columns of three-dimensional symbol holders, and spinning a selected individual one of the plurality of three-dimensional symbol holders, and giving a reward when a winning combination appears under the payline after the spinning step.

2. A regulated video slot gaming machine, comprising:

a display;

a game controller configured to control the display, and interact with a player;

a plurality of three-dimensionally represented reels displayed on the display, each of plurality of reels including a plurality of graphics thereon, the graphics being static, animated or video rendered, and each of the plurality of reels being configured to spin such that a portion of each of the reels, from a given perspective angle, is out of view as the reels spin and such that respective ones of the graphics of each reel come into and out of view as the reels spin;

at least one three-dimensionally represented payline displayed on the display, the at least one payline configured to wrap around the plurality of three-dimensionally represented reels such that a portion of each of the at least one payline faces the respective out of view portions of the plurality of reels, wagers based on the at least one payline in accordance with a paytable, the information on the out of view portions of the reels being revealed to a player to allow the player to determine if an out-of-view portion of the payline includes a winning combination.

3. The gaming machine of claim 1, wherein each of the at least one three-dimensionally represented payline wraps around the plurality of three-dimensionally represented reels in one of horizontally, vertically, diagonally and in a zigzag pattern.

4. The gaming machine of claim 1, wherein the plurality of three-dimensionally represented reels are configured to be rotatable from the given perspective angle to a player-selected perspective angle to reveal the out of view portions of the reels.

5. The gaming machine of claim 1, wherein the player selected perspective angle is controlled using a multi-touch display.

6. A method, comprising:

providing a regulated video slot gaming machine having a display and a game controller configured to control the display, interact with a player and allow the player to place a wager on selected paylines in accordance with a predetermined paytable;

configuring the gaming machine to display a plurality of three-dimensional reels on the display, each of the plurality of reels including a plurality of graphics, the graphics being static, animated or video rendered;

configuring the gaming machine to spin the displayed reels such that a portion of each of the reels, from a given perspective angle, is out of view as the reels spin and such that respective ones of the plurality of graphics of each of the reels come into and out of view as the reels spin, and configuring the gaming machine to display at least one three-dimensional payline on the display and configuring the at least one payline to wrap around the plurality of three-dimensionally represented reels such that a portion of each of the at least three-dimensional payline faces the respective out of view portions of the plurality of reels.

7. The method of claim 6, wherein the last configuring step includes configuring the gaming machine to wrap the at least one three-dimensionally represented payline around the plurality of three-dimensionally represented reels one of horizontally, vertically, diagonally and in a zigzag pattern.

8. The method of claim 6, further comprising a step of enabling wagering on the portion of the three-dimensional payline that faces the respective out of view portions of the plurality of reels in accordance with the predetermined paytable.

9. The method of claim 6, further comprising a step of configuring the gaming machine to enable the player to change the given perspective angle using one of a pointing device, a predetermined button and a multi-touch display.

10. The method of claim 6, further comprising a step of configuring the gaming machine to enable the player to rotate the plurality of displayed three-dimensional reels using one of a pointing device, a predetermined button and a multi-touch display.

11. A regulated video slot gaming machine, comprising:

a display;

a game controller configured to control the display, interact with a player and allow a player to place a wager on selected paylines in accordance with a predetermined paytable;

a plurality of three-dimensionally represented reels displayed on the display, each of plurality of reels including a plurality of three-dimensional symbol holders, each face of each symbol holder being configured to display a symbol thereon and each of the plurality of three-dimensional symbol holders being configured to spin such that at least one face of each symbol holder is out of view as the reels spin;

at least one three-dimensional payline displayed on the display, the at least one payline being configured to wrap around the plurality of three-dimensionally represented reels such that a portion of the payline is out of view, each of the at least one payline being represented one of horizontally, vertically, diagonally and in a zigzag pattern.

12. The gaming machine of claim 11, wherein each of the plurality of reels are configured to spin.

13. The gaming machine of claim 11, wherein at least two faces of each symbol holder have a same symbol thereon.

14. The gaming machine of claim 11, wherein each face of each symbol holder has a different symbol thereon.

15. The gaming machine of claim 11, wherein at least one of the plurality of symbol holders is a cube.

16. The gaming machine of claim 11, wherein at least one of the plurality of symbol holders is one of a hemisphere, a cuboid, a tetrahedron, a cylinder, a cone, an octahedron, a prism, a pyramid, and a dodecahedron.

17. The gaming machine of claim 11, wherein at least one of the plurality of symbol holders is configured to change shapes at least once at least one of before, during and after a spinning of the plurality of reels.

18. The gaming machine of claim 17, wherein shapes of the symbol holders appearing under the payline constitute a combination on which a wager may be placed.

19. The gaming machine of claim 11, wherein symbols appearing under the payline and shapes of the symbol holders appearing under the payline, in combination, constitute a combination on which a wager may be placed.

20. The gaming machine of claim 11, wherein at least one face of each symbol holder shows a video rendering of the symbol animation or a 3D animation of the symbol.

21. The gaming machine of claim 20, wherein the video rendering or the 3D animation of each symbol holder appearing under the payline constitutes a combination on which a wager may be placed.

22. The gaming machine of claim 11, wherein each face of each symbol holder is configured to display a symbol thereon and at least one attribute selected from a group consisting of at least one of color, texture and movement and wherein a combination of at least one of symbols, colors, textures and movements constitutes a combination on which a wager may be placed.

23. The gaming machine of claim 11, wherein the plurality of three-dimensional reels and the three-dimensional payline are displayed from a perspective point of view and wherein the perspective point of view is configured to be changeable by a player of the gaming machine using one of a pointing device, a predetermined button and a multi-touch display or by a software executing in the game controller.

24. The gaming machine of claim 11, wherein the plurality of three-dimensional reels and the three-dimensional payline are displayed from a plurality of perspective points of view simultaneously on the display.

25. A method, comprising:

providing a regulated video slot gaming machine having a display and a game controller configured to control the display, interact with a player and allow the player to place a wager on selected paylines in accordance with a predetermined paytable;

configuring the gaming machine to display a plurality of three-dimensional reels, each of the plurality of reels including a plurality of three-dimensional symbol holders, each face of each symbol holder being configured to display a symbol thereon and each of the plurality of three-dimensional symbol holders being configured to spin such that at least one face of each symbol holder is out of view as the reels spin;

configuring the gaming machine to display at least one three-dimensional payline, the at least one payline being configured to wrap around the plurality of three-dimensionally represented reels such that a portion of the payline is out of view;

spinning at least one of the plurality of three-dimensional symbol holders, and giving a reward when a winning combination appears under the payline after the spinning step.

26. The method of claim 25, wherein the spinning step also spins at least one of the plurality of reels.

27. The method of claim 25, wherein the first configuring step is carried out such that at least two faces of each symbol holder have a same symbol thereon.

28. The method of claim 25, wherein the first configuring step is carried out such that each face of each symbol holder has a different symbol thereon.

29. The method of claim 25, wherein the first configuring step is carried out such that at least one of the plurality of symbol holders is a cube.

30. The method of claim 25, wherein the first configuring step is carried out such that at least one of the plurality of symbol holders is one of a hemisphere, a cuboid, a tetrahedron, a cylinder, a cone, an octahedron, a prism, a pyramid, and a dodecahedron.

31. The method of claim 25, further comprising a step of changing a shape of at least one of the plurality of symbol holders at least once at least one of before, during and after the spinning step.

32. The method of claim 31, wherein the reward giving step is carried out with the shapes of the symbol holders appearing under the payline constituting a combination on which a wager may be placed.

33. The method of claim 25, wherein the reward giving step is carried out with the symbols appearing under the payline and the shapes of the symbol holders appearing under the payline, in combination, constituting a combination on which a wager may be placed.

34. The method of claim 25, further comprising a step of showing a video rendering of the symbol animation or a 3D animation of the symbol on at least one face of each symbol holder.

35. The method of claim 34, wherein the reward giving step is carried out with the video rendering or the 3D animation of each symbol holder appearing under the payline constituting a combination on which a wager may be placed.

36. The method of claim 25, wherein the first configuring step is carried out with each face of each symbol holder displaying thereon a symbol and at least one attribute selected from a group consisting of at least one of color, texture and movement and wherein the winning combination includes a predetermined combination of at least one of symbols, colors, textures and movements.

37. The method of claim 24, wherein the configuring steps are carried out such that the plurality of three-dimensional reels and the three-dimensional payline are displayed from a perspective point of view and wherein the method further includes a step of enabling the perspective point of view to be changeable by a player of the gaming machine or by a software executing in the game controller.

38. The method of claim 25, further comprising a step of displaying the plurality of three-dimensional reels and the three-dimensional payline from a plurality of perspective points of view simultaneously.

39. A regulated gaming machine, comprising:

a display;

a game controller configured to control the display, interact with a player and allow the player to place a wager on selected paylines in accordance with a predetermined paytable;

a plurality of three-dimensionally represented reels displayed on the display, each of plurality of reels including a plurality of three-dimensional symbol holders, each face of each symbol holder being configured to display a symbol thereon and each of the plurality of three-dimensional symbol holders being configured to spin such that at least one face of each symbol holder is out of view as the reels spin, the plurality of reels collectively defining a plurality of rows of three-dimensional symbol holders and a plurality of columns of three-dimensional symbol holders;

at least one three-dimensional payline displayed on the display, the at least one payline being configured to wrap around the plurality of three-dimensionally represented reels such that a portion of each of the at least one payline is out of view, wherein each symbol holder, each of the plurality of rows of three-dimensional symbol holders and each of the plurality of columns of three-dimensional symbol holders is configured to be independently spun.

* * * * *